June 27, 1950 J. D. WEAVER 2,512,701

DROP-TYPE RECORD CHANGER WITH RECORD LOWERING DEVICE

Filed Feb. 28, 1944 2 Sheets-Sheet 1

INVENTOR
JERALD D. WEAVER
BY [signature]
ATTORNEY

June 27, 1950 J. D. WEAVER 2,512,701

DROP-TYPE RECORD CHANGER WITH RECORD LOWERING DEVICE

Filed Feb. 28, 1944 2 Sheets-Sheet 2

INVENTOR
JERALD D. WEAVER
BY Edwin M. Martin
ATTORNEY

Patented June 27, 1950 2,512,701

UNITED STATES PATENT OFFICE 2,512,701

DROP-TYPE RECORD CHANGER WITH RECORD LOWERING DEVICE

Jerald D. Weaver, San Gabriel, Calif., assignor, by mesne assignments, to Farnsworth Research Corporation, a corporation of Indiana Application February 28, 1944, Serial No. 524,195

14 Claims. (Cl. 274—10)

This invention relates generally to automatic phonograph apparatus and more particularly to an automatic phonograph mechanism for successively dropping one record at a time from a stack to a turntable.

In automatic phonograph apparatus of the type adapted successively to drop one record at a time from a stack to a turntable, it is necessary that the stack of records to be played be supported above the turntable in such a manner that space is provided to allow records to accumulate as the individual records are played. Therefore, it is necessary that the lowermost supported record of the stack of records drop through a considerable distance to the turntable. Various mechanisms have been proposed for supporting and successively dropping records, some of which include a plurality of peripheral supports or a peripheral support and supporting means on the centering spindle. In each of these forms of record-changing mechanism, the lowermost supported record of the stack is usually released by a horizontally movable member which slides the lowermost record off the supports, allowing it to drop and be guided by the centering spindle into playing position upon the turntable.

In the above described drop type record-changing mechanisms, objectionable noise is produced by each record as it drops to the turntable since there is no mechanism provided for controlling the speed at which the record drops or for controlling the position of the record to maintain it in a horizontal position.

Accordingly, the principal object of this invention is to provide a novel record-changing apparatus of the type adapted to drop one record at a time to the turntable.

Another object of this invention is to provide an automatic record-changing apparatus including a mechanism effective after a record is released from the stack for decreasing the distance of free fall of the record whereby to prevent noise during each operation.

It is also an object of the present invention to provide automatic record-changing apparatus of the type adapted successively to drop records from a stack to a turntable having improved and simplified construction.

In accordance with the present invention there is provided an automatic record-changing apparatus comprising a turntable for supporting a record thereon, a fixed tubular centering spindle having a shoulder adapted for supporting a stack of records by engaging an edge portion at the centering aperture of the lowermost supported record and an adjustable peripheral support adapted when in a first position to cooperate with said shoulder in supporting a stack of small records and when in a second position for cooperating with said shoulder in supporting a stack of large records. A movable member is provided on said peripheral support which may be controlled by the record-changing mechanism for sliding the lowermost supported record off said shoulder and said peripheral support. For preventing the released record from dropping directly and freely to the turntable, there is provided a pneumatically controlled record-conveying mechanism which engages the record as it falls and gradually lowers it to a predetermined point above the turntable. The record then may be released to drop a remaining short distance to the turntable and the record is parallel therewith as it drops. Thus, by conveying the record through a substantial portion of its path to the turntable before it is released, there is substantially no noise created by the record as it impacts the turntable or preceding records.

For a better understanding of the invention, together with other and further objects thereof, reference is made to the following description taken in connection with the accompanying drawings and its scope will be pointed out in the appended claims.

Figures 1, 2, 3, 4:
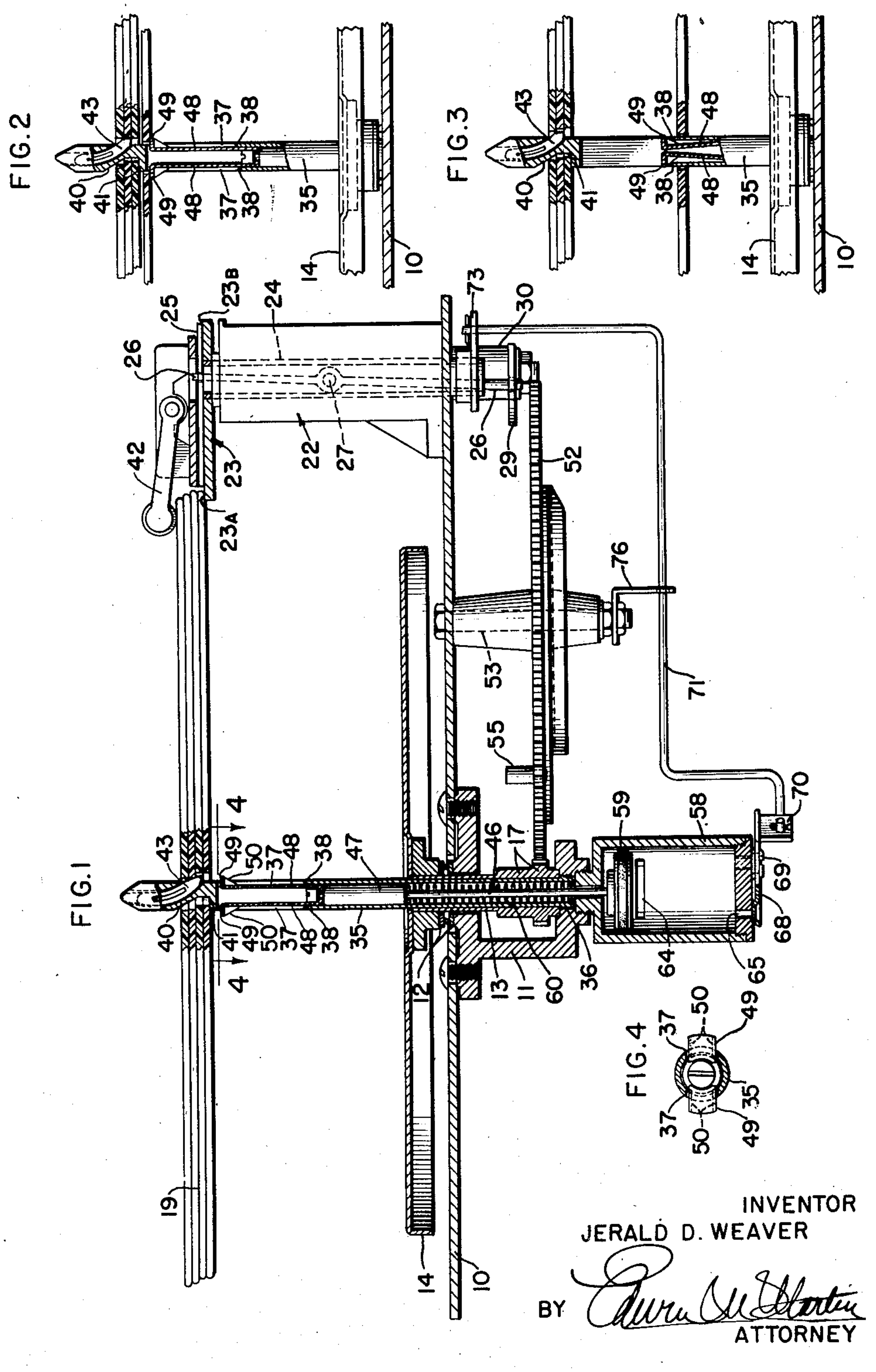
Fig. 1 is a side elevation view, partly in section, of the invention showing a group of records supported above the turntable, and showing, in section, the mechanism for conveying a released record to the turntable.
Fig. 2 is a fragmentary view of the apparatus illustrated in Fig. 1, partly in section, showing a released record supported by the conveying mechanism.
Fig. 3 is a fragmentary view of the apparatus illustrated in Fig. 1, partly in section, showing the position of the record-conveying mechanism when a record is released to drop freely to the turntable.
Fig. 4 is an enlarged fragmentary view taken on line 4—4 of Fig. 1.
Figure 5:
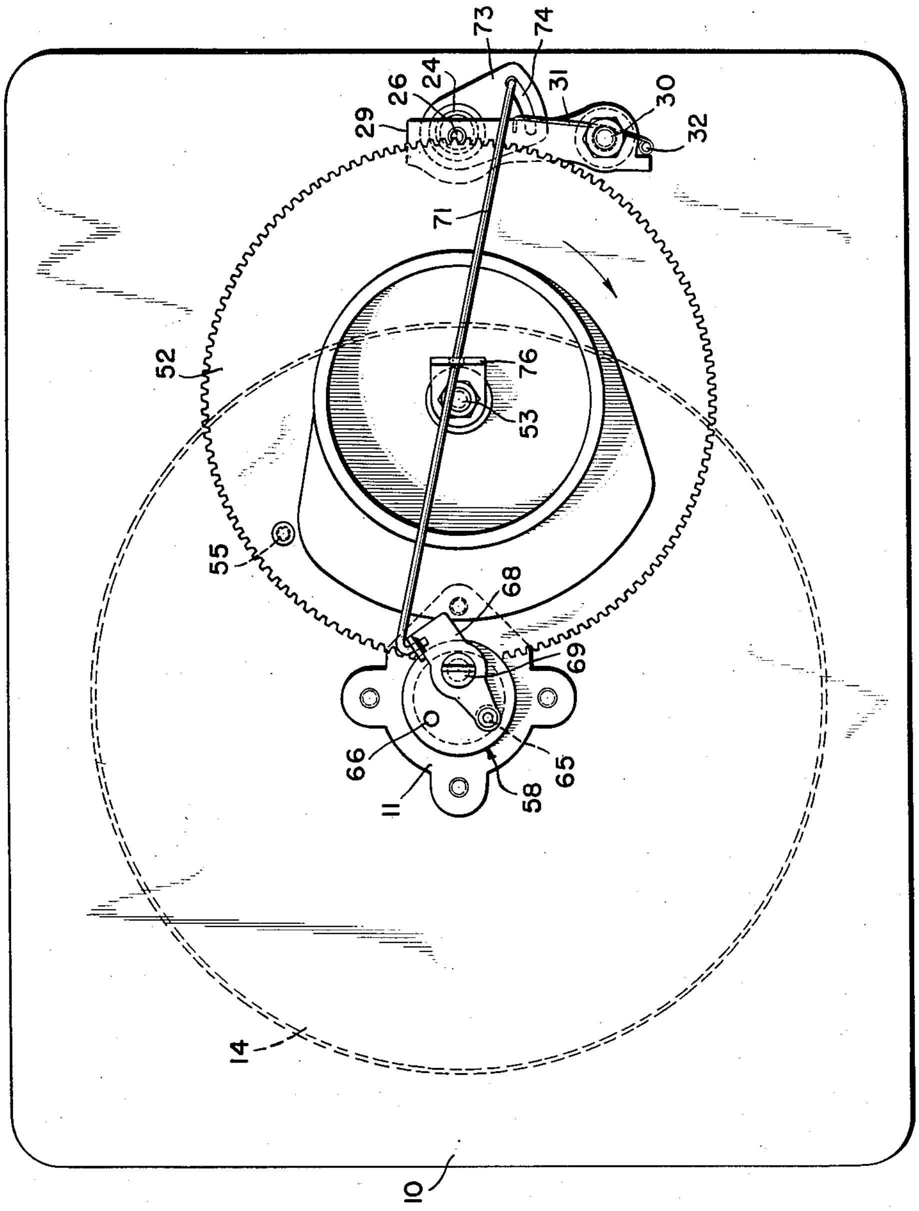
Fig. 5 is a bottom plan view of the apparatus shown in Fig. 1, showing the mechanism for adjusting the record-conveying mechanism for properly lowering small or large records after they are released from their supports.

Referring now more particularly to Figs. 1, 4 and 5 of the drawings, there is illustrated a record-changing apparatus including a base plate 10 from which is suspended a bracket 11. The bracket 11 supports a bearing member 12 for rotatably supporting a tubular shaft 13 which extends above and below base plate 10 (Fig. 1). A turntable 14 for supporting and rotating disc records, is connected in a suitable manner to the upper end of the shaft 13. The lower end of the shaft 13 comprises a pinion gear 17 (Fig. 1), the function of which will be described hereinafter. The driving mechanism for the turntable 14 and the reproducing mechanism for playing a record on the turntable may be similar to that disclosed in United States Patent No. 2,299,633, dated October 20, 1942.

The mechanism for supporting a stack of records 19 (Fig. 1) above the turntable 14 and for moving the records, one at a time, to playing position upon the turntable is disclosed in the aforementioned patent and illustrated in Fig. 1. There is provided a peripheral support comprising a pedestal 22 fixed to the base plate 10 (Fig. 1) in a suitable manner. At the upper end of the pedestal, there is provided a swivelly mounted bracket 23 affixed to a rotatable tubular shaft 24 which extends downwardly through the pedestal 22 and below the base plate 10. The bracket 23 is provided with two record-supporting shelves 23A and 23B for supporting small or large records, and supports a slidable member 25 which is adapted to be moved into engagement with the peripheral edge of the lowermost supported record. The member 25 may be moved, in a manner presently to be described, by means of a lever 26 pivotally mounted as at 27 within the tubular shaft 24. The upper end of the lever 26 engages the member 25 and its lower end engages a lever 29 pivotally mounted on a stud 30 depending below the base plate 10 (Figs. 1 and 5). The lever 29 is normally biased to the position shown in Fig. 5 by means of a spring member 31, one end of which is anchored to a stop 32 and the other end of which is anchored to the lever 29 as shown in Fig. 5.

As shown in Fig. 1, in addition to the peripheral supporting bracket 23, there is provided a fixed tubular centering pin 35 which extends upwardly through the tubular shaft 13. The tubular centering pin 35 may be fixed in a suitable manner to the bottom of the bracket 11, as for example, by a threaded portion 36 (Fig. 1). Near the upper end of the centering pin 35, there is provided a pair of slots 37 preferably diametrically opposite to each other. At the lower ends of the slots, pin 35 is beveled inwardly as at 38, as shown in Fig. 1. The slots extend downwardly preferably to a point separated from the turntable by a distance slightly in excess of the thickness of a complete stack of records whereby the free fall of a released record is reduced to a minimum. Above the slots 37 there is provided a notch 40 which forms a shoulder 41 in the plane of the bracket 23 adapted to cooperate with the bracket 23 in supporting a stack of records. When the bracket 23 is in the position shown in Fig. 1, the record-supporting shelf 23A cooperates with the shoulder 41 to support a stack of ten-inch records, and when the bracket 23 is manually rotated 180° the record-supporting shelf 23B cooperates with the shoulder 41 to support a stack of twelve-inch records. A pivoted member 42 provided on the bracket 23 (Fig. 1) engages the top record of the stack 19 and is adapted to retain the records in the supported position.

A slidable member 43 is provided in the upper end of the tubular pin 35 (Fig. 1). When the member 43 is in the position shown in Fig. 1, it is adapted to center at least the lowermost record of the stack of records 19 thereby to maintain the records in supported position upon the shoulder 41 and shelf 23A. When a stack of played records is to be removed from the turntable 14, the records may be lifted upwardly. The records engage the member 43 and move it upwardly, facilitating in removing the records without any adjustment of the centering pin 35.

As shown in Fig. 1, the tubular centering pin 35 guides a movable shaft 46. The upper end of the shaft 46 is enlarged as at 47 to engage the inner walls of pin 35 and to support a pair of movable record-supporting members 48. These members are flexible but normally assume the vertical position shown in Fig. 1. The upper ends of members 48 are formed to provide horizontal record-supporting portions 49 (Figs. 1 and 4). The portions 49 are provided with tapered flanges 50 (Figs. 1 and 4), which are disposed to move in the slots 37 (Figs. 1 and 4). When a record is released to the portions 49 of the movable members 48 (Fig. 1), the members 48 and shaft 46 are moved downwardly under the weight of the record to a point where the flanges 50 engage beveled portions 38 of pin 35 at a predetermined height above the turntable 14. It is to be noted that while the released record is conveyed downwardly on portions 49, it assumes a horizontal position parallel to the turntable. Further movement of shaft 46 causes flanges 50 to move the members 48 inwardly with respect to the center of the centering pin 35 (as shown in Fig. 3), thereby to move the portions 49 out of engagement with the record supported thereon and release said record to be guided by the centering pin 35 into playing position upon the turntable 14. Since the record was in a horizontal position at the time of release, it falls in that position whereby at impact with the turntable the noise of such impact is substantially unnoticeable.

For actuating the lever 29 and slidable member 25 (Figs. 1 and 5), there is provided a cam wheel 52 supported on a shaft 53 depending below the base plate 10 (Fig. 1). Cam wheel 52 is adapted to be driven through a complete revolution by the pinion gear 17. A mechanism such as that disclosed in United States Patent No. 2,299,633 of October 20, 1942, may be utilized to initiate and carry out a record-changing cycle. For moving the lever 29 in a clockwise direction against the biasing action of the spring member 31, there is provided a pin 55 on the cam gear 52 (Figs. 1 and 5). This movement of the lever 29 causes the lever 26 to move the slidable member 25 (Fig. 1) into engagement with the lowermost record and move the record off the supports 23A and 41. When the pin 55 moves out of engagement with the lever 29, the spring member 31 returns the levers 29, 26 and member 25 to their respective positions shown in Figs. 1 and 5.

While a record is resting upon the members 48, it is necessary to control the speed at which the record descends toward the turntable 14. This mechanism is disclosed in Figs. 1 and 5 and includes a cylinder 58 in which a piston 59, affixed to the lower end of the shaft 46 (Fig. 1), is adapted to move. The cylinder 58 may be fixed to the bracket 11, as for example, in the manner shown in Fig. 1. The shaft 46 and piston 59 may be biased to the position shown in Fig. 1 by a spring 60, the lower end of which rests upon the upper end of the cylinder 58, and the upper end of which abuts against the lower end of the portion 47 on the shaft 46. The spring 60 cooperates with the piston 59 in retarding the speed at which the record descends; however, its main function is to return the elements 46 and 59 to their normal position after the record has been released from the members 48, in the manner previously described. The air pocket above the piston 59 at the upper end of cylinder 58 provides a cushion when the piston returns to its normal position.

It will be evident that when a large record is resting upon the members 48, the piston 59 normally might be forced downwardly faster than it is when a small record is resting on the members 48. The means for compensating for the varied speed of movement of the piston 59, due to the difference in weight of large and small records, is shown in Figs. 1 and 5. In Fig. 1, a large aperture 64 is provided near the upper end of the cylinder 58 and slightly beneath the idle position of the piston. In Fig. 5, a pair of smaller apertures 65 and 66 are provided in the bottom of the cylinder 58. The large aperture 64 admits air into the cylinder 58 and the small apertures 65 and 66 act as valves in controlling the amount of air forced out of the cylinder 58 by the piston 59 in a given time as it is forced downwardly by a small or large record. The diameter of the aperture 66 is larger than that of aperture 65, as shown in Fig. 5. A movable member 68 pivoted as at 69 on the bottom of the cylinder 58 (Fig. 5) is adapted to be moved into position to close either of the apertures 65 and 66. As shown in Fig. 1, the member 68 is provided with a turned-down ear 70. The member 68 is connected to move in unison with the bracket 23 by means of an irregularly shaped rod 71, the inner end of which is connected to the ear 70 on the member 68 and the outer end of which is connected to a member 73 affixed to the lower end of the shaft 24 (Figs. 1 and 5). The member 73 is moved through a greater angle by the bracket 23 than is necessary to move the member 68 from one to the other of the apertures 65 and 66. Therefore, the elongated slot 74 is provided in the member 73 to compensate for this difference in angular movement of the members 73 and 68.

When the bracket 23 is in the position shown in Fig. 1, for cooperating in supporting a stack of small records, the member 68 is in position to close the smaller aperture 65 and the outer end of the rod 71 is in engagement with the outer end of the slot 74 (Fig. 5). When the bracket 23 is moved 180° in a counterclockwise direction from the position shown in Fig. 1 for cooperating in supporting a stack of large records, the inner end of the slot 74 on the member 73 engages the outer end of the rod 71 and pivots the rod 71 in a counterclockwise direction on a support 76 affixed to the lower end of the shaft 53 (Figs. 1 and 5). This movement of the rod 71 is sufficient to move the member 68 in a clockwise direction (Fig. 5) sufficiently far to move the member 68 from the smaller aperture 65 into position to close the larger aperture 66.

In operation, when the bracket 23 is in position for supporting small records and the piston 59 is forced downwardly by a small record, the air in the cylinder 58 is forced out through the large aperture 66 to thereby gradually lower the piston 59 and therewith the small record. When the mechanism is set to support a stack of large records and a large record is moved onto the members 48, the piston 59 would normally be forced downwardly faster than when a small record is on the members 48. However, when the bracket 23 is in this latter position, the aperture 66 is closed and the air is forced out of the cylinder 58 through the small aperture 65. Since the air naturally escapes more slowly through the aperture 65 than through the aperture 66, the large record is likewise gradually lowered toward the turntable 14.

*Mode of operation*

The general mode of operation of the record-changing apparatus will now be described. It will be assumed that the record-supporting bracket 23 is set to cooperate with the shoulder 41 for supporting a stack of small records.

When a record on the turntable 14 is played and the cam wheel 52 is moved into driving engagement with the pinion gear 17, by a pickup arm and tripping mechanism not shown in the drawings, the cam wheel 52 is driven through a complete revolution. The patent referred to hereinbefore discloses the tripping operation in detail. As the cam gear 52 rotates, the pin 55 on the cam gear 52 (Fig. 1) engages the left-hand end of the lever 29 (Fig. 5) and moves the lever in a clockwise direction against the biasing action of the spring 31 (Fig. 5). This movement of the lever 29 causes the lever 26 to move in a counterclockwise direction (Fig. 1) thereby to move the slidable member 25 inwardly toward the center of the turntable. As the member 25 moves inwardly, it engages the peripheral edge of the lowermost supported record and moves the record laterally sufficiently far to move the record off the supporting shelf 23A and shoulder 41 (Fig. 1). Immediately thereafter the pin 55 moves out of engagement with the lever 29 and the spring member 31 returns the elements 29, 26 and 25 to their normal positions shown in Fig. 1.

When the lowermost supported record is moved off the elements 23A and 41, it rests in a horizontal plane upon the record-supporting portions 49 of the spring members 48, as shown in Fig. 2. Immediately thereafter the weight of the record forces the shaft 46 and piston 59 downwardly (Fig. 1). As soon as the piston 59 passes the aperture 64 in the cylinder 58, the air in the lower portion of the cylinder tends to be compressed and thereafter is forced out of the cylinder through the large aperture 66 (Fig. 5). Since the aperture 66 is of a proper size to control the flow of air out of the cylinder 58 in a predetermined interval of time, the piston 59 is retarded to descend slowly and the lowermost record is gradually lowered toward the turntable 14.

When the record has been lowered to a predetermined point above the turntable, the angular portions 50 of the movable members 48 (Figs. 1–3) engage the beveled portion 38 of the pin 35. When the portions 38 and 50 engage, the flexible members 48 are moved inwardly toward the center of the pin 35 sufficiently far to release the record, as shown in Fig. 3. Thus, the lowermost record is lowered and released to be guided by the pin 35 into playing position upon the turntable 14.

Immediately after the lowermost record is released from the members 48, the spring member 60 moves the members 48, the shaft 46 and piston 59 back to the position shown in Fig. 1, wherein the spring members 48 move outwardly to their record-supporting position.

Figure 6:
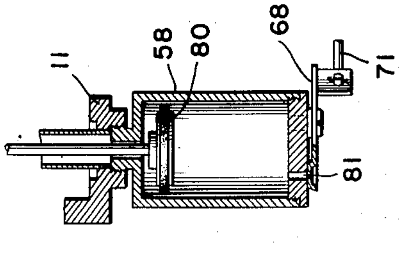
Fig. 6 is a fragmentary view illustrating a modification of the invention.

It is not intended that this invention shall be limited to the specific speed control mechanism described hereinbefore for retarding the descent of a released record. There is illustrated in Fig. 6 a modification of the invention wherein there is provided, in cylinder 58, a piston 80 adapted to fit loosely with respect to the walls of the cylinder. The piston 58 may be completely sealed except for a single aperture 81 for allowing the escape of air at a predetermined rate during the period of descent of a small record. For controlling the rate of descent of a large record, member 68 is provided for sealing aperture 81. During the period of fall of the large record, no aperture is necessary by reason of the clearance between the piston 80 and the wall of the cylinder. The gap between the piston and the cylinder wall will allow sufficient air to escape to the rear of the piston to provide a slow rate of fall for large records.

Assuming that a small record is released to fall to the turntable on the members 48, rod 71 will have positioned member 68 to one side of aperture 81 whereby a predetermined amount of air may escape from the cylinder, thereby to allow a predetermined rate of descent of small records. When a stack of large records is placed on the record supports above the turntable, bracket 23 must necessarily have been rotated to position shelf 23–B over the turntable. Such rotation will be transmitted through the rod 71 to member 68 to rotate member 68 into such a position that aperture 81 is blocked. Therefore, when the large record is positioned on members 48, the clearance between piston 80 and the walls of the cylinder will provide an increased retarding effect and allow the large record to descend toward the turntable at the same rate as in the case of the small record. Regardless of whether a small record or a large record is released to the turntable, spring 60 will return piston 80 to its idle position as described hereinbefore in connection with the preferred modification of the invention.

The invention may be further modified by providing an oil-filled dash pot in place of the air cylinders described hereinbefore. In such a case, suitable valves would be provided to be controlled from bracket 23 in accordance with the size of the records in the stack.

From the description of the invention, it will be apparent to those skilled in the art that this invention provides a mechanism for preventing released records from assuming any position other than one in a plane parallel to the turntable. Furthermore, the mechanism also decreases to a material degree the impact of the record falling to the turntable or to other records already on the turntable. By reason of these characteristics of the mechanism provided in accordance with this invention, noise of operation and damage to records are reduced to an unnoticeable minimum.

It is not intended that this invention shall be limited to use in conjunction with the particular record-supporting mechanism described herein or to use in connection with the particular change cycle control mechanism, as it will be obvious to those skilled in the art that this invention is applicable to any record-changing mechanism wherein records are dropped from above the turntable.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A record-changing apparatus comprising a turntable, a centering pin, supporting means for supporting a stack of records, movable means associated with said supporting means for successively moving said records off said supporting means, a movable member associated with said centering pin adapted to convey a record toward said turntable after said record is released from said supports, means associated with said movable member for controlling the rate of movement thereof, and means associated with said movable member for moving said member out of engagement with said record when said record is lowered to a predetermined distance above said turntable.

2. A record-changing apparatus comprising a turntable, a centering pin, supporting means movable for supporting a stack of small records or a stack of large records, movable means associated with said supporting means for successively moving said records off said supporting means, a movable member associated with said centering pin adapted to convey a record toward said turntable after said record is released from said supports, means associated with said supporting means and said movable member for limiting the movement thereof to the same rate for both large and small records, and means associated with said movable member for moving said member out of engagement with said record when said record is lowered to a predetermined distance above said turntable.

3. A record-changing apparatus comprising a turntable, a tubular centering pin, supporting means movable for supporting a stack of small records or a stack of large records, movable means associated with said supporting means for successively moving said records off said supporting means, a movable member within said centering pin adapted to convey a record toward said turntable after said record is released from said supports, cylinder and piston means associated with said supporting means and said movable member for limting the movement thereof to the same rate for both large and small records, and means associated with said movable member for moving said member out of engagement with said record when said record is lowered to a predetermined distance above said turntable.

4. A record-changing apparatus comprising a turntable, a tubular centering pin, supporting means movable for supporting a stack of small records or a stack of large records, movable means associated with said supporting means for successively moving said records off said supporting means, a movable member within said centering pin adapted to convey a record toward said turntable after said record is released from said supports, cylinder and piston means associated with said movable member for controlling the rate of movement thereof, means associated with said cylinder and piston means and said supporting means for relieving pressure in said cylinder at one rate for small records and at another rate for large records, and means associated with said movable member for moving said member out of engagement with said record when said record is lowered to a predetermined distance above said turntable.

5. A record-handling apparatus for an automatic phonograph comprising a record-centering portion and a movable portion including a record-supporting device, means associated with said record-supporting device and said centering portion for moving said record-supporting device with respect to said centering portion from a record-supporting position to a record-releasing position, a cylinder fixed with respect to said centering portion and provided with ports of different sizes, closure means associated with said cylinder and movable into register with said ports for closing any one of them, and piston means in said cylinder connected to said movable portion.

6. A record-handling apparatus for an automatic phonograph comprising an outer slotted portion and a movable portion including a pair of record-supporting members in register with a corresponding slot in said slotted portion, an inclined surface on each record-supporting member for engaging said slotted portion for retracting said flexible members within said slotted portion, a cylinder connected to said slotted portion and provided with ports of different sizes, closure means associated with said cylinder and movable into register with said ports for closing any one of them, and piston means in said cylinder connected to said movable portion.

7. A record-handling apparatus for an automatic phonograph comprising an outer slotted portion and a portion including a pair of flexible record-supporting members in register with a corresponding slot in said slotted portion movable from a record-supporting position to a record-releasing position, an inclined surface at one end of each record-supporting member for engaging in said record-releasing position said slotted portion at the end of the slot for retracting said flexible members within said slotted portion, a cylinder connected to said slotted portion and provided with ports of different sizes, closure means associated with said cylinder and movable into register with said ports for closing any one of them, and piston means in said cylinder connected to said movable portion.

8. A record-handling apparatus for an automatic phonograph comprising an outer slotted tubular portion and an inner portion including a pair of flexible record-supporting members in register with a corresponding slot in said tubular portion movable from a record-supporting position to a record-releasing position, an inclined surface at one end of each record-supporting member for engaging in said record-releasing position said tubular portion at the end of the slot for retracting said flexible members within said tubular portion, a cylinder connected to said tubular portion and provided with ports of different sizes, closure means associated with said cylinder and movable into register with each of said ports for closing any one of them, and piston means in said cylinder connected to said inner movable portion.

9. A record-changing apparatus comprising a turntable, a peripheral support for supporting a stack of records of different sizes, a centering pin, movable cam means, movable means associated with said peripheral support and said movable cam means for moving the lowermost supported record off said peripheral support, a movable member associated with said centering pin having a pair of spring members for supporting the lowermost record by engaging diametrically opposite edge portions at the centering aperture of said record when said lowermost record is moved off said peripheral support, means associated with said peripheral support and said spring members for controlling the rate of movement thereof in accordance with record size, and means associated with said spring members and said centering pin for moving said spring members out of engagement with said lowermost record when said record has been lowered to a predetermined distance above said turntable whereby the lowermost supported record is released and is guided by said centering pin into playing position upon said turntable.

10. A record-changing apparatus comprising a turntable, a centering pin, an adjustable peripheral support adapted when in a first position to support a stack of small records and when in a second position to support a stack of large records, a movable cam means, a movable means operatively associated with said peripheral support and said movable cam means for moving the lowermost supported record off said peripheral support, a movable member operatively associated with said centering pin and including a pair of spring members positioned diametrically opposite to one another and adapted to support the lowermost record by engaging edge portions at the centering aperture of the lowermost record when said lowermost record is moved off said peripheral support, means operatively associated with said movable member and said peripheral support for controlling the rate of movement thereof for lowering either small or large records at the same rate toward said turntable, and means associated with said spring members and said centering pin for moving said spring members out of engagement with said lowermost record when said record has been lowered to a predetermined distance above said turntable whereby the lowermost record is released to be guided by said centering pin into playing position upon said turntable.

11. A record-changing apparatus comprising a turntable, a tubular centering pin, a peripheral support means for supporting a stack of records, a movable cam means, movable means operatively associated with said movable cam means and said peripheral support for moving the lowermost supported record off said peripheral support, a movable shaft within said tubular pin, a pair of movable members affixed to the upper end of said shaft and adapted to support said lowermost record by engaging diametrically opposite edge portions at the centering aperture of the lowermost record when moved off said peripheral support, means connected to the lower end of said movable shaft and to said peripheral support means for controlling the rate of movement of said shaft as it is forced downwardly by the weight of said record on said movable members in accordance with the record size, and means on said movable members and said tubular centering pin for moving said movable members out of engagement with said lowermost record when said record has been lowered to a predetermined height above said turntable, whereby the lowermost record is released to drop into playing position upon said turntable.

12. A record-changing apparatus comprising a turntable, a tubular centering pin, a shoulder on said centering pin for supporting a stack of records of different sizes by engaging an edge portion at the centering aperture of the lowermost supported record, a peripheral support for cooperating with said shoulder in supporting said stack of records, a movable cam means, movable means associated with said movable cam means and said peripheral support for moving said lowermost record off said shoulder and said peripheral support, a movable shaft within said tubular pin and supporting a pair of movable members for supporting said lowermost record by engaging diametrically opposite edge portions at the centering aperture of said record when the record is moved off said shoulder and said peripheral support, a spring member adapted to maintain normally said shaft and therewith said movable members in a position immediately below said shoulder, means associated with said movable shaft and said peripheral support for controlling the rate of movement thereof in accordance with record size, and means for moving said movable members out of engagement with said lowermost record when said record has been lowered to a predetermined height above said turntable, thereby releasing said lowermost record to drop into playing position upon said turntable.

13. A record-changing apparatus comprising a turntable, a slotted tubular centering pin, a shoulder on said centering pin for supporting a stack of records by engaging an edge portion of the centering aperture of the lowermost supported record, a movable peripheral support adapted when in a first position to cooperate with said shoulder in supporting a stack of small records and when in a second position for cooperating with said shoulder in supporting a stack of large records, a movable cam means, a movable means associated with said peripheral support and said movable cam means for moving said lowermost record off said shoulder and said peripheral support, a movable shaft within said tubular centering pin and supporting a pair of movable members in register with the slot in said pin for supporting said lowermost record by engaging diametrically opposite edge portions at the centering aperture of said record when said record is moved off said shoulder and said peripheral support, a control means operatively associated with said movable shaft and said movable peripheral support and controllable by said peripheral support when moved to said first and second positions for controlling the rate of movement of said movable shaft for lowering either small or large records toward said turntable at the same rate, and means for moving said movable members out of engagement with said lowermost record when said record has been lowered to a predetermined distance above said turntable to thereby release said lowermost record to be guided by said centering pin into playing position upon said turntable.

14. A record-changing apparatus comprising a turntable, a centering pin, a record support adapted to support a stack of records of different sizes, movable cam means, movable means associated with said cam means and said record support for successively moving said records off said record support, a movable member associated with said centering pin adapted to convey a record toward said turntable after said record is released from said support, means associated with said record support and said movable member for controlling the rate of movement of said movable member in accordance with the record size, and means associated with said movable member for moving said member out of engagement with said record when said record is lowered to a predetermined distance above said turntable whereby said lowermost record is released and dropped into playing position upon said turntable.

JERALD D. WEAVER.

REFERENCES CITED

The following references are of record in the file of this patent:

UNITED STATES PATENTS

| Number | Name | Date |
|---|---|---|
| 1,390,404 | Wahlberg | Sept. 13, 1921 |
| 1,438,000 | Underhill | Dec. 5, 1922 |
| 1,449,252 | Stout | Mar. 20, 1923 |
| 1,568,130 | Blackwell | Jan. 5, 1926 |
| 1,879,291 | Johnson et al. | Sept. 27, 1932 |
| 2,090,746 | Compare | Aug. 24, 1937 |
| 2,178,886 | Cloer | Nov. 7, 1939 |
| 2,290,518 | Wright | July 21, 1942 |